United States Patent
Wang

(10) Patent No.: US 10,070,473 B2
(45) Date of Patent: *Sep. 4, 2018

(54) SIGNAL TRANSMISSION METHOD FOR DEVICE TO DEVICE DIRECT COMMUNICATION BETWEEN USER EQUIPMENTS AND USER EQUIPMENT

(71) Applicant: HUAWEI DEVICE (DONGGUAN) CO., LTD., Dongguan (CN)

(72) Inventor: Jian Wang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,528

(22) Filed: Mar. 7, 2017

(65) Prior Publication Data

US 2017/0181209 A1 Jun. 22, 2017

Related U.S. Application Data

(63) Continuation of application No. 15/025,047, filed as application No. PCT/CN2013/084499 on Sep. 27, 2013, now Pat. No. 9,635,489.

(51) Int. Cl.
*H04W 56/00* (2009.01)
*H04W 76/14* (2018.01)
*H04W 76/02* (2009.01)
*H04L 27/26* (2006.01)

(52) U.S. Cl.
CPC ......... *H04W 76/14* (2018.02); *H04L 27/2678* (2013.01); *H04W 56/001* (2013.01); *H04W 76/023* (2013.01)

(58) Field of Classification Search
None
See application file for complete search history.

(56) References Cited

U.S. PATENT DOCUMENTS

| | | |
|---|---|---|
| 2010/0093364 A1 | 4/2010 | Ribeiro et al. |
| 2011/0182280 A1 | 7/2011 | Charbit et al. |
| 2012/0236830 A1 | 9/2012 | Takano et al. |
| 2012/0258706 A1 | 10/2012 | Yu et al. |

(Continued)

FOREIGN PATENT DOCUMENTS

| | | |
|---|---|---|
| CN | 102123111 A | 7/2011 |
| CN | 103108389 A | 5/2013 |

(Continued)

OTHER PUBLICATIONS

Huawei et al.; "Considerations on timing for D2D"; 3GPP TSG RAN WG1 Meeting #75; R1-135047; San Francisco, USA; Nov. 11-15, 2013; 5 pages.

(Continued)

*Primary Examiner* — David Bilodeau

(57) ABSTRACT

The present application relates a signal transmission method for device to device direct communication between user equipment. A first user equipment first determines, according to a downlink timing reference time, a receiving time for receiving a device to device direct communication (D2D) signal sent by a second user equipment, and then the first user equipment receives, before the receiving time, the D2D signal sent by the second user equipment, thereby improving accuracy of a time for receiving a signal by the user equipment and ensuring completeness of received data.

18 Claims, 6 Drawing Sheets

---

First user equipment determines, according to a downlink timing reference time, a receiving time for receiving a device to device direct communication D2D signal sent by second user equipment, where the downlink timing reference time is a time at which user equipment receives data from a base station — S101

The first user equipment receives, before the receiving time, the D2D signal sent by the second user equipment — S102

(56) References Cited

U.S. PATENT DOCUMENTS

| | | |
|---|---|---|
| 2013/0142268 A1 | 6/2013 | Gao |
| 2013/0170414 A1 | 7/2013 | Kwon |
| 2014/0370904 A1 | 12/2014 | Smith et al. |
| 2015/0110037 A1 | 4/2015 | Wu et al. |
| 2015/0139197 A1 | 5/2015 | He et al. |
| 2015/0319745 A1 | 11/2015 | Seo et al. |
| 2015/0358964 A1 | 12/2015 | Tiirola |
| 2016/0007383 A1 | 1/2016 | Chae |
| 2016/0007400 A1 | 1/2016 | Agiwal |
| 2016/0036576 A1 | 2/2016 | Wang |
| 2016/0073392 A1 | 3/2016 | Byun et al. |
| 2016/0150492 A1 | 5/2016 | Wang |
| 2016/0219393 A1 | 7/2016 | Wang |
| 2017/0026937 A1 | 1/2017 | Jung et al. |

FOREIGN PATENT DOCUMENTS

| | | |
|---|---|---|
| CN | 103188742 A | 7/2013 |
| CN | 103250435 A | 8/2013 |
| CN | 103347246 A | 10/2013 |
| CN | 103457690 A | 12/2013 |
| EP | 2866503 A1 | 4/2015 |
| EP | 2 925 067 A1 | 9/2015 |
| EP | 2925067 A1 | 9/2015 |
| JP | 2010110022 A | 5/2010 |
| JP | 2011130088 A | 6/2011 |
| JP | 2016502367 A | 1/2016 |
| WO | 2007096823 A1 | 8/2007 |
| WO | WO 2010/108549 A1 | 9/2010 |
| WO | WO 2013/100831 A1 | 7/2013 |
| WO | WO 2013/104084 A1 | 7/2013 |
| WO | 2013181421 A2 | 12/2013 |
| WO | 2014003430 A1 | 1/2014 |

OTHER PUBLICATIONS

Huawei et al.; "Timing signaling for D2D communication"; 3GPP TSG RAN WG1 Meeting #76b; R1-141596; Shenzhen, China; Mar. 31-Apr. 4, 2014; 5 pages.

Huawei et al.; "Timing signaling for D2D communication"; 3GPP TSG RAN WG1 Meeting #77; R1-141930; Seoul, Korea; May 19-23, 2014; 5 pages.

LG Electronics; "Discussion on D2D signal transmission and reception timing"; 3GPP TSG RAN WG1 Meeting #76bis; R1-141359; Shenzhen, China, Mar. 31-Apr. 4, 2014; 6 pages.

Huawei et al.; "Considerations on timing and synchronization for D2D"; 3GPP TSG RAN WG1 Meeting #74bis; R1-134072; Guangzhou, China; Oct. 7-11, 2013; 5 pages.

3rd Generation Partnership Project; Technical Specification Group Radio Access Network; Evolved Universal Terrestrial Radio Access (E-UTRA); Multiplexing and channel coding (Release 12); 3GPP TS 36.212 V12.0.0; Dec. 2013; 88 pages.

"3rd Generation Partnership Project; Technical Specification Group Radio Access Network; Evolved Universal Terrestrial Radio Access (E-UTRA); Physical channels and modulation (Release 12)"; 3GPP TS 36.211 V12.0.0; Dec. 2013; 120 pages.

"3rd Generation Partnership Project; Technical Specification Group Radio Access Network; Evolved Universal Terrestrial Radio Access (E-UTRA); Physical layer procedures (Release 12)"; 3GPP TS 36.213 V12.0.0; Dec. 2013; 186 pages.

3rd Generation Partnership Project; Technical Specification Group Radio Access Network; Evolved Universal Terrestrial Radio Access (E-UTRA); Medium Access Control (MAC) protocol specification (Release 12); 3GPP TS 36.321 V12.0.0; Dec. 2013; 57 pages.

3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331 V12.0.0; Dec. 2013; 349 pages.

Delay=T1-(T2+t3)=-(T1-T0)-(T2-T0): Maximum round trip time

Delay=T1-(T2+t3)=-2*(T2-T0): Maximum round trip time

Delay=-(T1-T0)-(T2-T0)-t3=-2*[(T1-T0)+(T2-T0)]: Twice a maximum round trip time

Advance=(T1-T0)+(T2-T0)-t3=(T1-T0)-(T2-T0): Maximum round trip time

SIGNAL TRANSMISSION METHOD FOR DEVICE TO DEVICE DIRECT COMMUNICATION BETWEEN USER EQUIPMENTS AND USER EQUIPMENT

CROSS REFERENCE TO RELATED APPLICATIONS

This application is a continuation of U.S. patent application Ser. No. 15/025,047, filed on Mar. 25, 2016, which is a national stage of International Application No. PCT/CN2013/084499, filed Sep. 27, 2013. Both of the aforementioned applications are hereby incorporated by reference in their entireties.

TECHNICAL FIELD

Embodiments of the present invention relate to the field of communications technologies, and in particular, to a signal transmission method for device to device direct communication between user equipment.

BACKGROUND

A device to device proximity service (Device to Device Proximity Service, D2D ProSe for short) already becomes a research subject of a 3rd Generation Partnership Project (The 3rd Generation Partnership, 3GPP) Long Term Evolution (Long Term Evolution, LTE) system Rel.12 system.

Generally, in a discovery process in a direct communication process and the direct communication process, user equipment adjusts, according to a timing advance configured by a base station, times for sending a signal and receiving a signal. However, because user equipment in an idle state cannot acquire the timing advance configured by the base station, a time for the user equipment to receive a signal is inaccurate, which may cause incompleteness of received data.

SUMMARY

Embodiments of the present invention provide a signal transmission method for device to device direct communication between user equipment, so as to enhance accuracy of a time for receiving a signal by the user equipment and ensure completeness of received data.

According to a first aspect, an embodiment of the present invention provides a signal transmission method for device to device direct communication between user equipment, including:

determining, by first user equipment according to a downlink timing reference time, a receiving time for receiving a device to device direct communication D2D signal sent by second user equipment, where the downlink timing reference time is a time at which the first user equipment receives data from a base station; and receiving, by the first user equipment before the receiving time, the D2D signal sent by the second user equipment.

With reference to the first aspect, in a first feasible implementation manner of the first aspect, advance duration is a multiple of duration corresponding to a cyclic prefix in the D2D signal.

With reference to the first feasible implementation manner, in a second feasible implementation manner, the advance duration is equal to the duration corresponding to the cyclic prefix in the D2D signal, or is ½ of the duration corresponding to the cyclic prefix in the D2D signal.

With reference to the first aspect, in a third feasible implementation manner, advance duration is a multiple of a synchronous timing offset of the first user equipment.

With reference to the third feasible implementation manner, the advance duration is equal to, twice, 6 times, 7 times, or 8 times the synchronous timing offset of the first user equipment.

With reference to the first aspect, in a fifth feasible implementation manner of the first aspect, advance duration is a sum of a multiple of duration corresponding to a cyclic prefix in the D2D signal and a multiple of a synchronous timing offset of the first user equipment.

With reference to the fifth feasible implementation manner, in a sixth feasible implementation manner, the advance duration is a sum of the duration corresponding to the cyclic prefix and the synchronous timing offset; or the advance duration is a sum of ½ of the duration corresponding to the cyclic prefix in the D2D signal and twice the synchronous timing offset; or the advance duration is a sum of the duration corresponding to the cyclic prefix in the D2D signal and twice the synchronous timing offset.

With reference to the first aspect or any one of the first feasible implementation manner to the sixth feasible implementation manner, in a seventh feasible implementation manner, both the first user equipment and the second user equipment are in an activated state; or both the first user equipment and the second user equipment are in an idle state; or the first user equipment is in an activated state and the second user equipment is in an idle state; or the first user equipment is in an idle state and the second user equipment is in an activated state.

With reference to the seventh feasible implementation manner, in an eighth feasible implementation manner, both the first user equipment and the second user equipment are in an activated state, and the duration corresponding to the cyclic prefix in the D2D signal is greater than or equal to a maximum round trip time in a system to which the first user equipment and the second user equipment belong.

With reference to the seventh feasible implementation manner, in a ninth feasible implementation manner, both the first user equipment and the second user equipment are in an idle state, and the duration corresponding to the cyclic prefix in the D2D signal is greater than or equal to a maximum round trip time in a system to which the first user equipment and the second user equipment belong.

With reference to the seventh feasible implementation manner, in a tenth feasible implementation manner, the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

With reference to any one of the seventh feasible implementation manner to the tenth feasible implementation manner, in an eleventh feasible implementation manner, the determining, by first user equipment according to a downlink timing reference time, a receiving time for receiving a device to device direct communication D2D signal sent by second user equipment specifically includes: if the first user equipment is in an activated state, using, by the first user equipment, the downlink timing reference time minus a timing advance as the receiving time, where the timing advance is preconfigured by a network side device; or if the first user equipment is in an idle state, using, by the first user equipment, the downlink timing reference time as the receiving time.

According to a second aspect, an embodiment of the present invention provides user equipment, where the user equipment is first user equipment and includes:

a processor, configured to determine, according to a downlink timing reference time, a receiving time for receiving a device to device direct communication D2D signal sent by second user equipment, where the downlink timing reference time is a time at which user equipment receives data from a base station; and a receiver, configured to receive, before the receiving time, the D2D signal sent by the second user equipment.

With reference to the second aspect, in a first feasible implementation manner of the second aspect, advance duration is a multiple of duration corresponding to a cyclic prefix in the D2D signal.

With reference to the second feasible implementation manner, in a second feasible implementation manner, the advance duration is equal to the duration corresponding to the cyclic prefix in the D2D signal, or is ½ of the duration corresponding to the cyclic prefix in the D2D signal.

With reference to the second aspect, in a third feasible implementation manner, advance duration is a multiple of a synchronous timing offset of the first user equipment.

With reference to the third feasible implementation manner, in a fourth feasible implementation manner, the advance duration is equal to, twice, 6 times, 7 times, or 8 times the synchronous timing offset of the first user equipment.

With reference to the second aspect, in a fifth feasible implementation manner of the second aspect, advance duration is a sum of a multiple of duration corresponding to a cyclic prefix in the D2D signal and a multiple of a synchronous timing offset of the first user equipment; or advance duration is a sum of duration corresponding to a cyclic prefix in the D2D signal and twice a synchronous timing offset.

With reference to the fifth feasible implementation manner, in a sixth feasible implementation manner, the advance duration is a sum of the duration corresponding to the cyclic prefix and the synchronous timing offset; or the advance duration is a sum of ½ of the duration corresponding to the cyclic prefix in the D2D signal and twice the synchronous timing offset.

With reference to the second aspect or any one of the first feasible implementation manner to the sixth feasible implementation manner, in a seventh feasible implementation manner, both the first user equipment and the second user equipment are in an activated state; or both the first user equipment and the second user equipment are in an idle state; or the first user equipment is in an activated state and the second user equipment is in an idle state; or the first user equipment is in an idle state and the second user equipment is in an activated state.

With reference to the seventh feasible implementation manner, in an eighth feasible implementation manner, both the first user equipment and the second user equipment are in an activated state, and the duration corresponding to the cyclic prefix in the D2D signal is greater than or equal to a maximum round trip time in a system to which the first user equipment and the second user equipment belong.

With reference to the seventh feasible implementation manner, in a ninth feasible implementation manner, both the first user equipment and the second user equipment are in an idle state, and the duration corresponding to the cyclic prefix in the D2D signal is greater than or equal to a maximum round trip time in a system to which the first user equipment and the second user equipment belong.

With reference to the seventh feasible implementation manner, in a tenth feasible implementation manner, the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

With reference to any one of the seventh feasible implementation manner to the tenth feasible implementation manner, in an eleventh feasible implementation manner, the processor is specifically configured to: if the first user equipment is in an activated state, use the downlink timing reference time minus a timing advance as the receiving time, where the timing advance is preconfigured by a network side device; or if the first user equipment is in an idle state, use the downlink timing reference time as the receiving time.

According to the signal transmission method for device to device direct communication between user equipment that are provided by the embodiments of the present invention, user equipment first determines, according to a downlink timing reference time, a receiving time for receiving a device to device direct communication D2D signal sent by another user equipment, and then the first user equipment receives, before the receiving time, the D2D signal sent by the second user equipment, thereby improving accuracy of a time for receiving a signal by the user equipment and ensuring completeness of received data.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
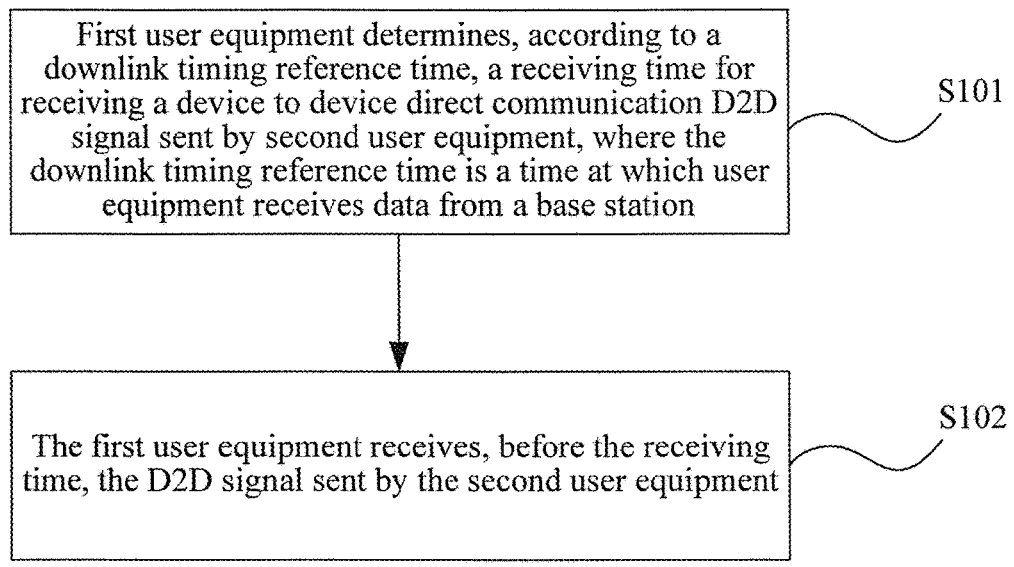
FIG. 1 is a flowchart of an embodiment of a signal transmission method according to the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Technologies described in this specification is applicable to various communications systems, for example, current 2G and 3G communications systems and a next-generation communications system, for example, a Global System for Mobile Communications (GSM, Global System for Mobile communications) system, a Code Division Multiple Access (CDMA, Code Division Multiple Access) system, a Time Division Multiple Access (TDMA, Time Division Multiple Access) system, a Wideband Code Division Multiple Access (WCDMA, Wideband Code Division Multiple Access Wireless) system, a Frequency Division Multiple Access (FDMA, Frequency Division Multiple Addressing) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems.

User equipment involved in this application may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN, Radio Access Network). The wireless terminal may be a mobile terminal, such as a mobile phone (also referred to as a "cellular" phone), and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) involved in this application may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS, Base Transceiver Station) in GSM or the CDMA, may also be a base station (NodeB) in WCDMA, or may further be an evolved NodeB (NodeB, eNB, or e-NodeB, evolutional Node B) in LTE, which is not limited in this application.

FIG. 1 is a flowchart of an embodiment of a signal transmission method according to the present invention. As shown in FIG. 1, the method includes:

S101: First user equipment determines, according to a downlink timing reference time, a receiving time for receiving a device to device direct communication D2D signal sent by second user equipment, where the downlink timing reference time is a time at which user equipment receives data from a base station.

S102: The first user equipment receives, before the receiving time, the D2D signal sent by the second user equipment.

Signal transmission involved in this embodiment of the present invention is signal transmission for device to device direct communication between user equipment's, which may specifically for device to device direct communication between user equipment's that are both in an activated state, device to device direct communication between user equipment's that are both in an idle state, or device to device direct communication between user equipment in an activated state and user equipment in an idle state.

That is, both the first user equipment and the second user equipment that are involved in the foregoing steps may be in an activated state; or both the first user equipment and the second user equipment may be in an idle state; or the first user equipment may be in an activated state and the second user equipment may be in an idle state; or the first user equipment may be in an idle state and the second user equipment may be in an activated state.

Figure 2:
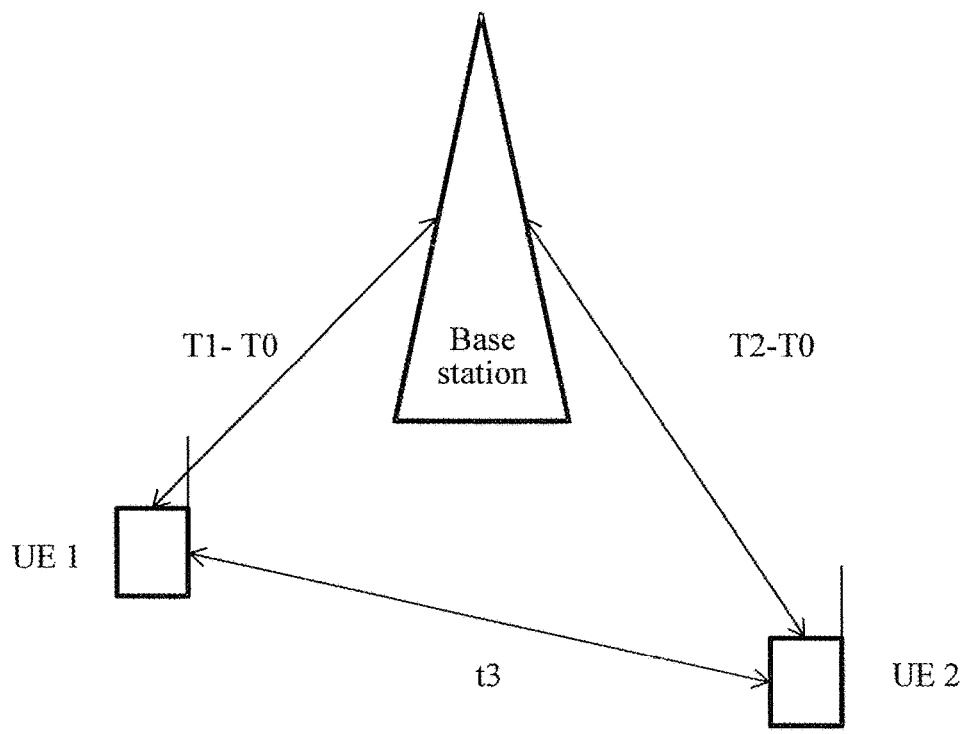
FIG. 2 is a schematic diagram of D2D communication in which both first user equipment and second user equipment are in an activated state according to an embodiment of the present invention.
Figure 3:
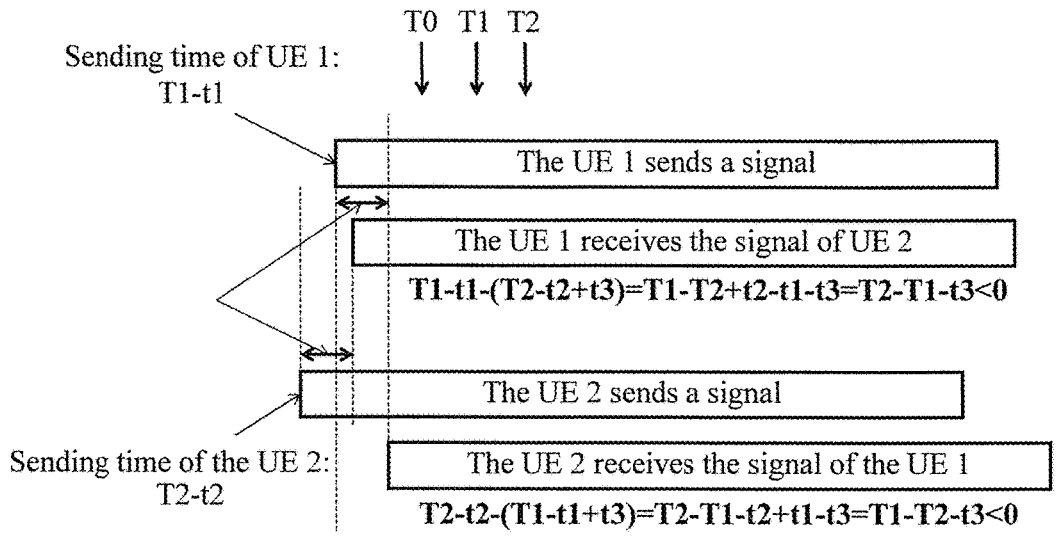
FIG. 3 is a schematic diagram of a time sequence relationship in D2D communication in an implementation scenario shown in FIG. 2.

Descriptions are given below by using an example in which both the first user equipment and the second user equipment are in an activated state. Referring to FIG. 2 and FIG. 3, UE 1 and UE 2 are within a coverage area of a same base station. It is assumed that T0 is a downlink timing reference time at which the base station sends downlink data, and is also an uplink timing reference time at which the base station receives uplink data. That is, the base station sends the downlink data to the UE 1 and the UE 2 at the moment T0. It is assumed that a downlink timing reference time for the UE 1 is T1, where the downlink timing reference time T1 is a time at which user equipment receives data from the base station, that is, the UE 1 receives the data from the base station at the time T1; similarly, a downlink timing reference time for the UE 2 is T2, that is, the UE 2 receives data from the base station at the time T2.

Because distances exist between the base station and the UE 1 and between the base station and the UE 2, a propagation delay is generated. It can be learned that a propagation delay between the UE 1 and the base station is T1−T0 and a propagation delay between the UE 2 and the base station is T2−T0; it is assumed that a propagation delay between the UE 1 and the UE 2 is t3.

Because the UE 1 is in an activated state, the base station configures a timing advance (timing advance) for the UE 1, where the timing advance is used for the UE 1 to adjust a sending time forward. Assuming that the timing advance of the UE 1 is t1, the base station configures t1 to 2*(T1−T0). The UE 1 sends a signal at a moment T1−t1. Because the propagation delay t3 exists between the UE 1 and the UE 2, when the UE 1 and the UE 2 perform device to device direct communication, a time at which the D2D signal sent by the UE 1 arrives at the UE 2 is T1−t1+t3.

Similarly, because the UE 2 is in an activated state, the base station also configures a timing advance (timing advance) for the UE 2, where the timing advance is used for the UE 2 to adjust a sending time forward. Assuming that the timing advance of the UE 2 is t2, the base station configures t2 to 2*(T2−T0). The UE 2 sends a signal at a moment T2−t2. Because the propagation delay t3 exists between the UE 1 and the UE 2, when the UE 1 and the UE 2 perform device to device direct communication, a time at which the D2D signal sent by the UE 2 arrives at the UE 1 is T2−t2+t3.

The UE 1 receives the D2D signal, which is sent by the UE 2, at the moment T1−t1 (that is, the downlink timing reference time minus the timing advance configured by the base station). Because the time at which the D2D signal sent by the UE 2 arrives at the UE 1 is T2−t2+t3, and the receiving time of the UE 1 is T1−t1, the arrival of the D2D signal of the UE 2 at the UE 1 is T1−t1−(T2−t2+t3) in advance of the receiving time, where T1−t1−(T2−t2+t3) is equal to T2−T1−t3 after derivation.

Similarly, the UE 2 receives the D2D signal, which is sent by the UE 1, at the moment T2−t2 (that is, the downlink timing reference time minus the timing advance configured by the base station). Because the time at which the D2D signal sent by the UE 1 arrives at the UE 2 is T1−t1+t3, and the receiving time of the UE 2 is T2−t2, the arrival of the D2D signal of the UE 1 at the UE 2 is T2−t2−(T1−t1+t3) in advance of the receiving time, where T2−t2−(T1−t1+t3) is equal to T1−T2−t3 after derivation.

It can be understood that both T2−T1−t3 and T1−T2−t3 are values less than or equal to 0. That is, for UE in an activated state, a signal that is sent by UE in an activated state and received by the UE in an activated state arrives after a receiving time.

Figure 4:
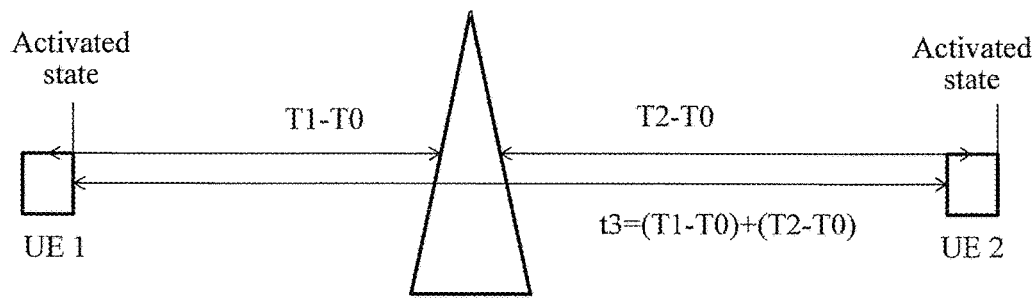
FIG. 4 is a schematic diagram of a timing advance and a maximum round trip time that are in the implementation scenario shown in FIG. 2.
Figure 4:
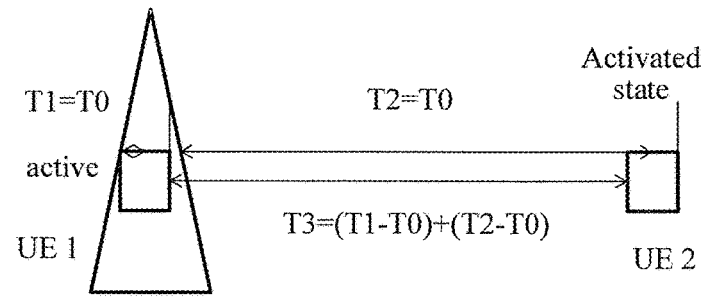

Referring to FIG. 4, in a scenario in which both the UE 1 and the UE 2 are in an activated state, duration corresponding to a cyclic prefix is greater than a maximum round trip (round trip) time.

Figure 5:
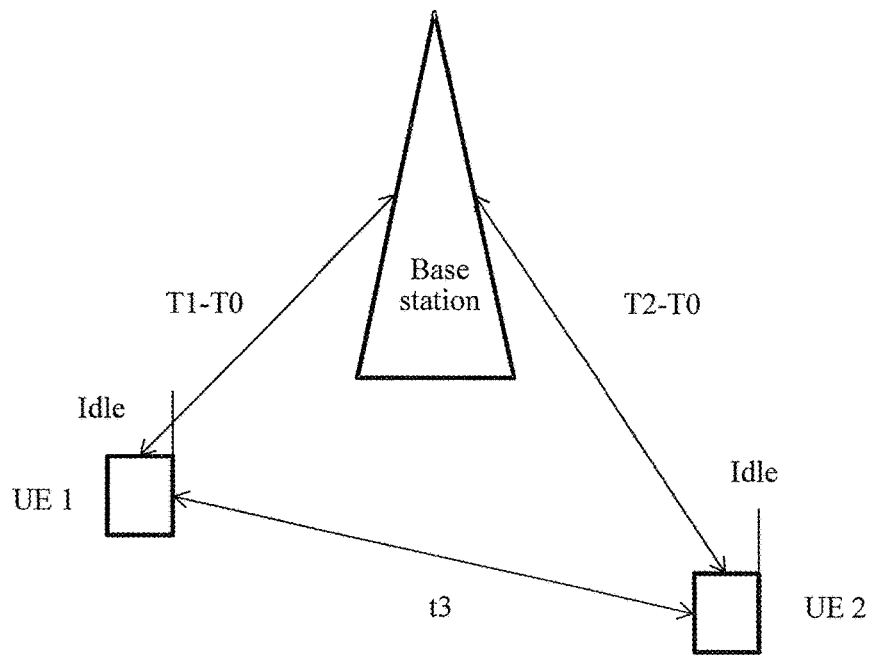
FIG. 5 is a schematic diagram of D2D communication in which both first user equipment and second user equipment are in an idle state according to an embodiment of the present invention.
Figure 6:
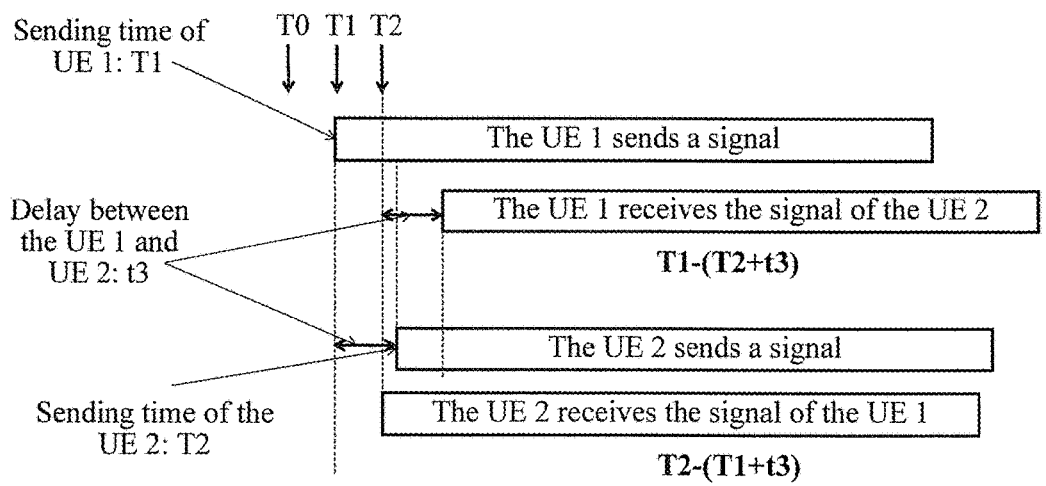
FIG. 6 is a schematic diagram of a time sequence relationship in D2D communication in an implementation scenario shown in FIG. 5.

Descriptions are given below again by using an example in which both the first user equipment and the second user equipment are in an idle state. Referring to FIG. 5 and FIG. 6, UE 1 and UE 2 are within a coverage area of a same base station. It is also assumed that T0 is a downlink timing reference time at which the base station sends downlink data, and is also an uplink timing reference time at which the base station receives uplink data. That is, the base station sends the downlink data to the UE 1 and the UE 2 at the moment T0. It is assumed that a downlink timing reference time for the UE 1 is T1, where the downlink timing reference time T1 is a time at which user equipment receives data from the base station, that is, the UE 1 receives the data from the base station at the time T1; similarly, a downlink timing reference time for the UE 2 is T2, that is, the UE 2 receives data from the base station at the time T2.

It is assumed that a propagation delay between the UE 1 and the base station is T1−T0, a propagation delay between the UE 2 and the base station is T2−T0, and a propagation delay between the UE 1 and the UE 2 is t3. Both the UE 1 and the UE 2 are users in an idle state.

Because the UE 1 is in an idle state, the UE 1 cannot obtain a timing advance configured by the base station; therefore, the UE 1 cannot adjust a sending time forward according to the timing advance, and can send and receive information only according to the downlink timing reference time. The UE 1 sends a signal at the moment T1 (that is, the downlink timing reference signal). Because the propagation delay t3 exists between the UE 1 and the UE 2, a time at which the signal sent by the UE 1 arrives at the UE 2 is T1−t3.

Similarly, because the UE 2 is in an idle state, the UE 2 cannot obtain a timing advance configured by the base station; therefore, the UE 2 cannot adjust a sending time forward according to the timing advance, and can send and receive information only according to the downlink timing time. The UE 2 sends a signal at the moment T2 (that is, the downlink timing reference signal). Because the propagation delay t3 exists between the UE 1 and the UE 2, a time at which the signal sent by the UE 2 arrives at the UE 1 is T2−t3.

The UE 1 receives, at the moment T1, the D2D signal sent by the UE 2. Because the time at which the D2D signal sent by the UE 2 arrives at the UE 1 is T2−t3, and the receiving time of the UE 1 is T1, the arrival of the D2D signal of the UE 2 at the UE 1 is T1−(T2+t3) in advance of the receiving time.

Similarly, the UE 2 receives, at the moment T2, the D2D signal sent by the UE 1. Because the time at which the D2D signal sent by the UE 1 arrives at the UE 2 is T1−t3, and a receiving time of the UE 2 is T2, the arrival of the D2D signal of the UE 1 at the UE 2 is T2−(T1+t3) in advance of the receiving time.

It can be understood that both T1−(T2+t3) and T2−(T1+t3) are values less than or equal to 0. That is, for UE in an idle state, a signal that is sent by UE in an activated state and received by the UE in an idle state arrives after a receiving time.

Figure 7:
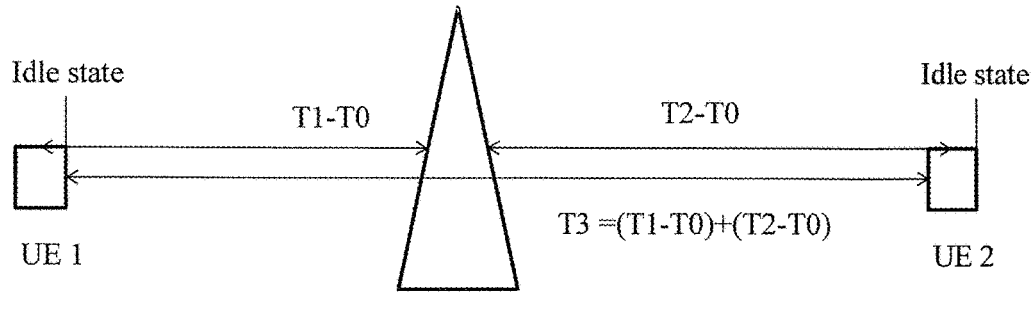
FIG. 7 is a schematic diagram of a timing advance and a maximum round trip time that are in the implementation scenario shown in FIG. 5.
Figure 7:
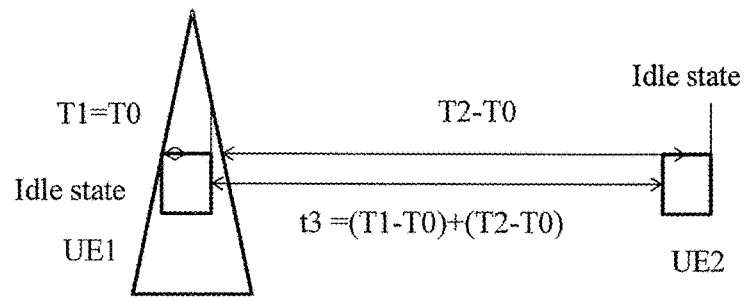

Referring to FIG. 7, in a scenario in which both the UE 1 and the UE 2 are in an idle state, duration corresponding to a cyclic prefix is greater than a maximum round trip (round trip) time.

Figure 8:
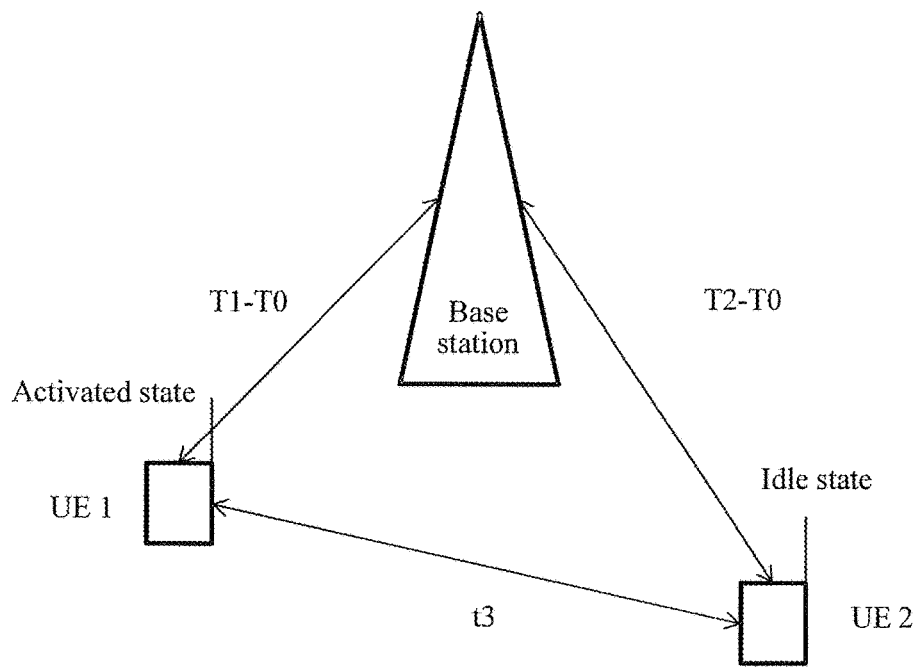
FIG. 8 is a schematic diagram of D2D communication in which first user equipment is in an idle state and second user equipment is in an activated state according to an embodiment of the present invention.
Figure 9:
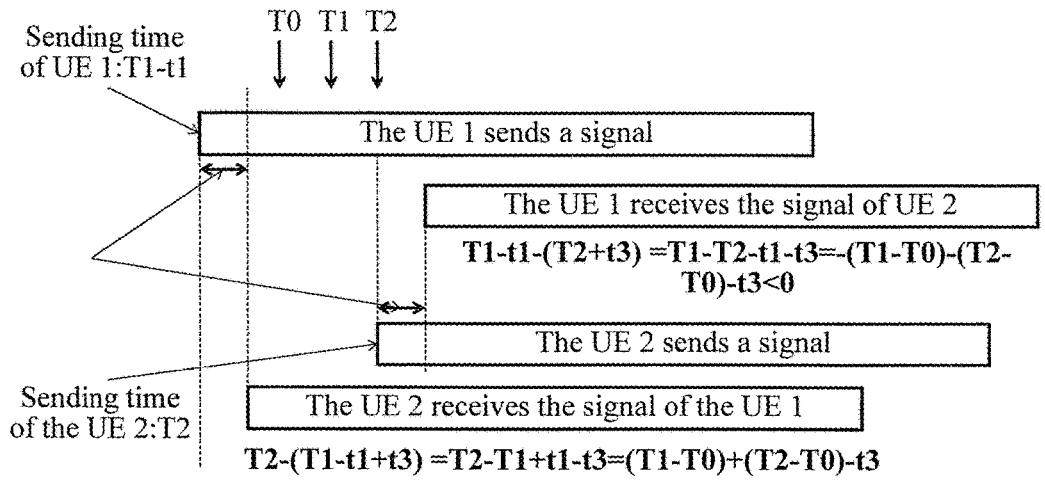
FIG. 9 is a schematic diagram of a time sequence relationship in D2D communication in an implementation scenario shown in FIG. 8.

Descriptions are given below again by using an example in which the second user equipment is in an activated state and the first user equipment is in an idle state. Referring to FIG. 8 and FIG. 9:

UE 1 and UE 2 are within a coverage area of a same base station, where the UE 1 is in an activated state, and the UE 2 is in an idle state. It is assumed that T0 is a downlink timing reference time at which the base station sends downlink data, and is also an uplink timing reference time at which the base station receives uplink data. That is, the base station sends the downlink data to the UE 1 and the UE 2 at the moment T0. It is assumed that a downlink timing reference time for the UE 1 is T1, where the downlink timing reference time T1 is a time at which user equipment receives data from the base station, that is, the UE 1 receives the data from the base station at the time T1; similarly, a downlink timing reference time for the UE 2 is T2, that is, the UE 2 receives data from the base station at the time T2.

Because distances exist between the base station and the UE 1 and between the base station and the UE 2, a propagation delay is generated. It can be learned that a propagation delay between the UE 1 and the base station is T1−T0 and a propagation delay between the UE 2 and the base station is T2−T0; it is assumed that a propagation delay between the UE 1 and the UE 2 is t3.

Because the UE 1 is in an activated state, the base station configures a timing advance (timing advance) for the UE 1, where the timing advance is used for the UE 1 to adjust a sending time forward. Assuming that the timing advance of the UE 1 is t1, the base station configures t1 to 2*(T1−T0). The UE 1 sends a signal at a moment T1−t1. Because the propagation delay t3 exists between the UE 1 and the UE 2, when the UE 1 and the UE 2 perform device to device direct communication, a time at which the D2D signal sent by the UE 1 arrives at the UE 2 is T1−t1+t3.

Because the UE 2 is in an idle state, the UE 2 cannot obtain a timing advance configured by the base station; therefore, the UE 2 cannot adjust a sending time forward according to the timing advance configured by the base station, and can send and receive information only according to the downlink timing time. The UE 2 sends a signal at the moment T2 (that is, the downlink timing reference signal). Because the propagation delay t3 exists between the UE 1 and the UE 2, a time at which the signal sent by the UE 2 arrives at the UE 1 is T2+t3.

The UE 1 receives, at the moment T1−t1, the D2D signal sent by the UE 2. Because the time at which the D2D signal sent by the UE 2 arrives at the UE 1 is T2+t3, and the receiving time of the UE 1 is T1−t1, the arrival of the D2D signal of the UE 2 at the UE 1 is T1−t1−(T2+t3) in advance of the receiving time.

The UE 2 receives, at the moment T2, the D2D signal sent by the UE 1. Because the time at which the D2D signal sent by the UE 1 arrives at the UE 1 is T1−t1+t3, and the receiving time of the UE 2 is T2, the arrival of the D2D signal of the UE 1 at the UE 2 is T2−(T1−t1+t3) in advance of the receiving time.

It can be understood that (T1−T0)+(T2−T0)−t3 is a value greater than or equal to 0. That is, for UE in an idle state, a signal that is sent by UE in an activated state and received by the UE in an idle state arrives before a receiving time. In other words, when UE in an idle state receives a signal sent by UE in an activated state, a receiving time is delayed, which causes that the UE in an idle state cannot completely receive the signal from the UE in an activated state, and therefore, cannot correctly decode the received signal.

The foregoing descriptions are given only by using the example in which the first user equipment is in an idle state and the second user equipment is in an activated state. An analysis process for a case in which the first user equipment is in an activated state and the second user equipment is in an idle state is similar, and is not described herein again.

Figure 10:
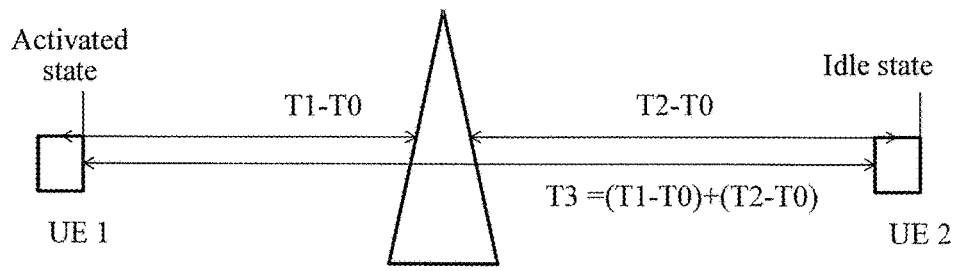
FIG. 10 is a schematic diagram of a timing advance and a maximum round trip time that are in the implementation scenario shown in FIG. 8.
Figure 10:
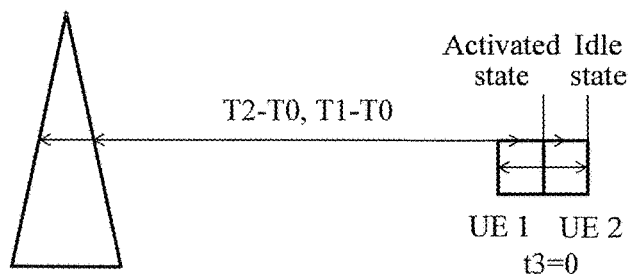

Referring to FIG. 10, in a scenario in which the UE 1 is in an activated state, the UE 2 is in an idle state, and the UE in an activated state receives a D2D signal sent by the UE in an idle state, duration corresponding to a cyclic prefix is greater than twice a maximum round trip (round trip) duration. Similarly, in a scenario in which the UE 1 is in an idle state, the UE 2 is in an activated state, and the UE in an idle state receives a D2D signal sent by the UE in an activated state, duration (in this case, the duration should be a time delay) corresponding to a cyclic prefix is greater than the maximum round trip (round trip) duration.

Optionally, advance duration for the receiving time may be a multiple of duration corresponding to a cyclic prefix in the D2D signal, a multiple of a synchronous timing offset of the first user equipment, or a sum of a multiple of duration corresponding to a cyclic prefix in the D2D signal and a multiple of a synchronous timing offset of the first user equipment. The involved multiple may be an integer multiple or a fractional multiple, which is not limited herein.

A D2D signal includes a cyclic prefix and data, and user equipment receiving a D2D signal needs to first remove a cyclic prefix and then receive data in the D2D signal.

It should be noted that, if both the first user equipment and the second user equipment are in an activated state, the duration corresponding to the cyclic prefix in the D2D signal may be greater than or equal to a maximum round trip time in a system to which the first user equipment and the second user equipment belong; if both the first user equipment and the second user equipment are in an idle state, the duration corresponding to the cyclic prefix in the D2D signal may be greater than or equal to a maximum round trip time in a system to which the first user equipment and the second user equipment belong; if the first user equipment is in an activated state and the second user equipment is in an idle state, or the first user equipment is in an idle state and the second user equipment is in an activated state, the duration corresponding to the cyclic prefix in the D2D signal may be greater than or equal to twice a maximum round trip time in a system to which the first user equipment and the second user equipment belong.

The D2D signal involved in this embodiment of the present invention may be transmitted by using various resources in different communications systems, for example, may be transmitted by using an OFDM symbol.

In an implementation scenario in which the advance duration is a multiple of the duration corresponding to the cyclic prefix in the D2D signal, for different communications systems, there may be different correspondences between the duration corresponding to the cyclic prefix and the advance duration. For example, the advance duration may be equal to the duration corresponding to the cyclic prefix in the D2D signal, or maybe ½ of the duration corresponding to the cyclic prefix in the D2D signal, or may be another multiple of the duration corresponding to the cyclic prefix in the D2D signal.

A synchronous timing offset of user equipment may be determined by the user equipment according to its own capability.

In an implementation scenario in which the advance duration is a multiple of the synchronous timing offset of the user equipment, the advance duration may be equal to, twice, 6 times, 7 times, 8 times, or another multiple of the synchronous timing offset. For example, 0.5 us or 1 us may be selected as the advance duration. For example, in a Long Term Evolution (Long Term Evolution, LTE) system, a maximum synchronous timing offset of UE may be 0.5 us, that is, 16 Ts (where Ts is 1/30720 ms and is a minimum sampling interval in the LTE system); therefore, the advance duration may be 0.5 us (16 Ts), 1 us (32 Ts), 3 us (96 Ts), 3.5 us (112 Ts), or 4 us (128 Ts). For other types of communications systems, for a maximum timing offset, reference may be made to respective parameters of the systems, which is not described herein again.

In an implementation scenario in which the advance duration is a sum of a multiple of the duration corresponding to the cyclic prefix in the D2D signal and a multiple of the synchronous timing offset of the first user equipment, the advance duration is a sum of the duration corresponding to the cyclic prefix and the synchronous timing offset; or the advance duration is a sum of ½ of the duration corresponding to the cyclic prefix in the D2D signal and twice the synchronous timing offset; or the advance duration may also be a sum of the duration corresponding to the cyclic prefix in the D2D signal and twice the synchronous timing offset.

According to the signal transmission method for device to device direct communication between user equipment that are provided by this embodiment of the present invention, user equipment first determines, according to a downlink timing reference time, a receiving time for receiving a device to device direct communication D2D signal sent by another user equipment, and then the first user equipment receives, before the receiving time, the D2D signal sent by the second user equipment, thereby improving accuracy of a time for receiving a signal by the user equipment and ensuring completeness of received data.

Figure 11:
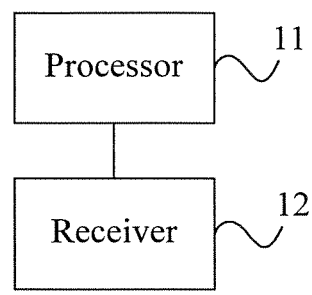
FIG. 11 is a schematic structural diagram of an embodiment of user equipment according to the present invention.

FIG. 11 is a schematic structural diagram of an embodiment of user equipment according to the present invention. As shown in FIG. 11, the user equipment is first user equipment and includes:

a processor 11, configured to determine, according to a downlink timing reference time, a receiving time for receiving a device to device direct communication D2D signal sent by second user equipment, where the downlink timing reference time is a time at which user equipment receives data from a base station; and a receiver 12, configured to receive, before the receiving time, the D2D signal sent by the second user equipment.

Optionally, advance duration is a multiple of duration corresponding to a cyclic prefix in the D2D signal.

Optionally, the advance duration is equal to the duration corresponding to the cyclic prefix in the D2D signal, or is ½ of the duration corresponding to the cyclic prefix in the D2D signal.

Optionally, advance duration is a multiple of a synchronous timing offset of the first user equipment.

Optionally, the advance duration is equal to, twice, 6 times, 7 times, or 8 times the synchronous timing offset of the first user equipment.

Optionally, advance duration is a sum of a multiple of duration corresponding to a cyclic prefix in the D2D signal and a multiple of a synchronous timing offset of the first user equipment.

Optionally, the advance duration is a sum of the duration corresponding to the cyclic prefix and the synchronous timing offset; or the advance duration is a sum of ½ of the duration corresponding to the cyclic prefix in the D2D signal and twice the synchronous timing offset; or the advance duration is a sum of the duration corresponding to the cyclic prefix in the D2D signal and twice the synchronous timing offset.

Optionally, both the first user equipment and the second user equipment are in an activated state; or both the first user equipment and the second user equipment are in an idle state; or the first user equipment is in an activated state and the second user equipment is in an idle state; or the first user equipment is in an idle state and the second user equipment is in an activated state.

Optionally, both the first user equipment and the second user equipment are in an activated state, and the duration corresponding to the cyclic prefix in the D2D signal is greater than or equal to a maximum round trip time in a system to which the first user equipment and the second user equipment belong.

Optionally, both the first user equipment and the second user equipment are in an idle state, and the duration corresponding to the cyclic prefix in the D2D signal is greater than or equal to a maximum round trip time in a system to which the first user equipment and the second user equipment belong.

Optionally, the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

Optionally, the processor 11 may be specifically configured to: if the first user equipment is in an activated state, use the downlink timing reference time minus a timing advance as the receiving time, where the timing advance is preconfigured by a network side device; or if the first user equipment is in an idle state, use the downlink timing reference time as the receiving time.

The user equipment provided by this embodiment is a device executing the signal transmission method for device to device direct communication between user equipment provided by the embodiments of the present invention. For a specific process of executing the method by the user equipment, reference may be made to related description in FIG. 1 to FIG. 8, which is not described herein again.

According to the user equipment provided by this embodiment of the present invention, user equipment first determines, according to a downlink timing reference time, a receiving time for receiving a device to device direct communication D2D signal sent by another user equipment, and then the first user equipment receives, before the receiving time, the D2D signal sent by the second user equipment, thereby improving accuracy of a time for receiving a signal by the user equipment and ensuring completeness of received data.

Figure 12:
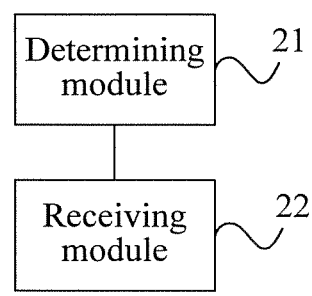
FIG. 12 is a schematic structural diagram of another embodiment of user equipment according to the present invention.

FIG. 12 is a schematic structural diagram of another embodiment of user equipment according to the present invention. As shown in FIG. 12, the user equipment is first user equipment and includes:

a determining module 21, configured to determine, according to a downlink timing reference time, a receiving time for receiving a device to device direct communication D2D signal sent by second user equipment, where the downlink timing reference time is a time at which user equipment receives data from a base station; and a receiving module 22, configured to receive, before the receiving time, the D2D signal sent by the second user equipment.

Optionally, advance duration is a multiple of duration corresponding to a cyclic prefix in the D2D signal.

Optionally, the advance duration is equal to the duration corresponding to the cyclic prefix in the D2D signal, or is ½ of the duration corresponding to the cyclic prefix in the D2D signal.

Optionally, advance duration is a multiple of a synchronous timing offset of the first user equipment.

Optionally, the advance duration is equal to, twice, 6 times, 7 times, or 8 times the synchronous timing offset of the first user equipment.

Optionally, advance duration is a sum of a multiple of duration corresponding to a cyclic prefix in the D2D signal and a multiple of a synchronous timing offset of the first user equipment.

Optionally, the advance duration is a sum of the duration corresponding to the cyclic prefix and the synchronous timing offset; or the advance duration is a sum of ½ of the duration corresponding to the cyclic prefix in the D2D signal and twice the synchronous timing offset; or the advance duration is a sum of the duration corresponding to the cyclic prefix in the D2D signal and twice the synchronous timing offset.

Optionally, both the first user equipment and the second user equipment are in an activated state; or both the first user equipment and the second user equipment are in an idle state; or the first user equipment is in an activated state and the second user equipment is in an idle state; or the first user equipment is in an idle state and the second user equipment is in an activated state.

Optionally, both the first user equipment and the second user equipment are in an activated state, and the duration corresponding to the cyclic prefix in the D2D signal is greater than or equal to a maximum round trip time in a system to which the first user equipment and the second user equipment belong.

Optionally, both the first user equipment and the second user equipment are in an idle state, and the duration corresponding to the cyclic prefix in the D2D signal is greater than or equal to a maximum round trip time in a system to which the first user equipment and the second user equipment belong.

Optionally, the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

Optionally, the determining module 21 is specifically configured to: if the first user equipment is in an activated state, use the downlink timing reference time minus a timing advance as the receiving time, where the timing advance is preconfigured by a network side device; or if the first user equipment is in an idle state, use the downlink timing reference time as the receiving time.

The user equipment provided by this embodiment is a device executing the signal transmission method for device to device direct communication between user equipment provided by the embodiments of the present invention. For a specific process of executing the method by the user equipment, reference may be made to related description in FIG. 1 to FIG. 8, which is not described herein again.

According to the user equipment provided by this embodiment of the present invention, user equipment first determines, according to a downlink timing reference time, a receiving time for receiving a device to device direct communication D2D signal sent by another user equipment, and then the first user equipment receives, before the receiving time, the D2D signal sent by the second user equipment, thereby improving accuracy of a time for receiving a signal by the user equipment and ensuring completeness of received data.

It may be clearly understood by a person skilled in the art that, for the purpose of convenient and brief description, division of the foregoing functional modules is used as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided by this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of this application.

What is claimed is:

1. A signal transmission method for device to device direct communication between user equipment, the method comprising:
   determining, by a first user equipment according to a downlink timing reference time, a receiving time for receiving a device to device direct communication (D2D) signal sent by a second user equipment, wherein the downlink timing reference time is a time at which the first user equipment receives data from a base station;

receiving, by the first user equipment before the receiving time, the D2D signal sent by the second user equipment; and wherein an advance duration that is before the receiving time is a multiple of a duration corresponding to a cyclic prefix in the D2D signal.

2. The method according to claim 1, wherein the advance duration is equal to the duration corresponding to the cyclic prefix in the D2D signal, or is ½ of the duration corresponding to the cyclic prefix in the D2D signal.

3. The method according to claim 1, wherein both the first user equipment and the second user equipment are in an activated state, and the duration corresponding to the cyclic prefix in the D2D signal is greater than or equal to a maximum round trip time in a system to which the first user equipment and the second user equipment belong.

4. The method according to claim 1, wherein both the first user equipment and the second user equipment are in an idle state, and the duration corresponding to the cyclic prefix in the D2D signal is greater than or equal to a maximum round trip time in a system to which the first user equipment and the second user equipment belong.

5. The method according to claim 1, wherein the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

6. The method according to claim 1, wherein determining, by first user equipment according to a downlink timing reference time, a receiving time for receiving a device to device direct communication D2D signal sent by second user equipment comprises:

using, by the first user equipment, the downlink timing reference time minus a timing advance as the receiving time, where the timing advance is preconfigured by a network side device, when the first user equipment is in an activated state; or using, by the first user equipment, the downlink timing reference time as the receiving time, when the first user equipment is in an idle state.

7. A signal transmission method for device to device direct communication between user equipment, the method comprising:

determining, by a first user equipment according to a downlink timing reference time, a receiving time for receiving a device to device direct communication (D2D) signal sent by a second user equipment, wherein the downlink timing reference time is a time at which the first user equipment receives data from a base station;

receiving, by the first user equipment before the receiving time, the D2D signal sent by the second user equipment; and wherein an advance duration that is before the receiving time is a multiple of a synchronous timing offset of the first user equipment.

8. The method according to claim 7, wherein the advance duration is equal to N times the synchronous timing offset of the first user equipment, where N equals 2, 6, 7 or 8.

9. The method according to claim 7, wherein both the first user equipment and the second user equipment are in an activated state, and the duration corresponding to the cyclic prefix in the D2D signal is greater than or equal to a maximum round trip time in a system to which the first user equipment and the second user equipment belong.

10. The method according to claim 7, wherein both the first user equipment and the second user equipment are in an idle state, and the duration corresponding to the cyclic prefix in the D2D signal is greater than or equal to a maximum round trip time in a system to which the first user equipment and the second user equipment belong.

11. The method according to claim 7, wherein the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

12. The method according to claim 7, wherein determining, by first user equipment according to a downlink timing reference time, a receiving time for receiving a device to device direct communication D2D signal sent by second user equipment comprises:

using, by the first user equipment, the downlink timing reference time minus a timing advance as the receiving time, where the timing advance is preconfigured by a network side device, when the first user equipment is in an activated state; or using, by the first user equipment, the downlink timing reference time as the receiving time, when the first user equipment is in an idle state.

13. A signal transmission method for device to device direct communication between user equipment, the method comprising:

determining, by a first user equipment according to a downlink timing reference time, a receiving time for receiving a device to device direct communication (D2D) signal sent by a second user equipment, wherein the downlink timing reference time is a time at which the first user equipment receives data from a base station;

receiving, by the first user equipment before the receiving time, the D2D signal sent by the second user equipment; and wherein an advance duration that is before the receiving time is a sum of a multiple of a duration corresponding to a cyclic prefix in the D2D signal and a multiple of a synchronous timing offset of the first user equipment.

14. The method according to claim 13, wherein:

the advance duration is a sum of the duration corresponding to the cyclic prefix and the synchronous timing offset; or the advance duration is a sum of ½ of the duration corresponding to the cyclic prefix in the D2D signal and twice the synchronous timing offset; or the advance duration is a sum of the duration corresponding to the cyclic prefix in the D2D signal and twice the synchronous timing offset.

15. The method according to claim 13, wherein both the first user equipment and the second user equipment are in an activated state, and the duration corresponding to the cyclic prefix in the D2D signal is greater than or equal to a maximum round trip time in a system to which the first user equipment and the second user equipment belong.

16. The method according to claim 13, wherein both the first user equipment and the second user equipment are in an idle state, and the duration corresponding to the cyclic prefix in the D2D signal is greater than or equal to a maximum round trip time in a system to which the first user equipment and the second user equipment belong.

17. The method according to claim 13, wherein the first user equipment is in an activated state and the second user equipment is in an idle state, or the first user equipment is in an idle state and the second user equipment is in an activated state, and the duration corresponding to the cyclic prefix in the D2D signal is greater than or equal to twice a maximum round trip time in a system to which the first user equipment and the second user equipment belong.

18. The method according to claim 13, wherein determining, by first user equipment according to a downlink timing reference time, a receiving time for receiving a device to device direct communication D2D signal sent by second user equipment comprises:

using, by the first user equipment, the downlink timing reference time minus a timing advance as the receiving time, where the timing advance is preconfigured by a network side device, when the first user equipment is in an activated state; or using, by the first user equipment, the downlink timing reference time as the receiving time, when the first user equipment is in an idle state.

* * * * *